US011881645B2

(12) United States Patent
Carle

(10) Patent No.: US 11,881,645 B2
(45) Date of Patent: Jan. 23, 2024

(54) MULTI-PART PRINTED CIRCUIT BOARD ADAPTER PLUG

(71) Applicant: Amphenol Tuchel Industrial GmbH, Heilbronn (DE)

(72) Inventor: Michael Carle, Heilbronn (DE)

(73) Assignee: AMPHENOL TUCHEL INDUSTRIAL GMBH, Heilbronn (DE)

(*) Notice: Subject to any disclaimer, the term of this patent is extended or adjusted under 35 U.S.C. 154(b) by 272 days.

(21) Appl. No.: 17/414,205

(22) PCT Filed: Dec. 16, 2019

(86) PCT No.: PCT/EP2019/085380
§ 371 (c)(1),
(2) Date: Jun. 15, 2021

(87) PCT Pub. No.: WO2020/127073
PCT Pub. Date: Jun. 25, 2020

(65) Prior Publication Data

US 2022/0069492 A1 Mar. 3, 2022

(30) Foreign Application Priority Data

Dec. 17, 2018 (DE) ..................... 10 2018 132 440.5

(51) Int. Cl.
*H01R 12/70* (2011.01)
*H01R 12/72* (2011.01)
*H01R 13/502* (2006.01)

(52) U.S. Cl.
CPC ....... *H01R 12/7076* (2013.01); *H01R 12/724* (2013.01); *H01R 13/502* (2013.01)

(58) Field of Classification Search
CPC . H01R 12/7076; H01R 12/724; H01R 13/502
(Continued)

(56) References Cited

U.S. PATENT DOCUMENTS 4,894,026 A * 1/1990 Dixon ................ H01R 13/6594 439/607.17
4,913,664 A 4/1990 Dixon et al.
(Continued)

FOREIGN PATENT DOCUMENTS

CN 2243129 Y * 12/1996 ........... H01R 13/648
CN 207265323 U * 4/2018 ........... H01R 12/707
(Continued)

OTHER PUBLICATIONS

Search Report issued in European Patent Application No. 19831646.5; Application Filing Date Dec. 16, 2019; dated Jun. 15, 2023 (8 pages).

(Continued)

*Primary Examiner* — Peter G Leigh

(57) ABSTRACT

An adapter plug and connector for making electrically conductive contact between a printed circuit board and at least one further electrical component. The adapter plug has at least one contacting device for conducting current within the adapter plug. The adapter plug is in at least two-part form and geometrically constructed in such a way that two plug-in planes, which are not parallel to one another, are formed by plug-in directions of the at least one further electrical component and the printed circuit board, respectively.

12 Claims, 4 Drawing Sheets

(58) Field of Classification Search
USPC .............................................................. 439/78
See application file for complete search history.

(56) References Cited

U.S. PATENT DOCUMENTS

| | | | | | |
|---|---|---|---|---|---|
| 4,921,431 | A * | 5/1990 | Garay | H01R 12/724 439/589 |
| 5,035,651 | A * | 7/1991 | Dixon | H01R 12/00 439/607.17 |
| 5,178,562 | A * | 1/1993 | Ermini | H01R 13/6583 439/607.19 |
| 5,281,169 | A * | 1/1994 | Kiat | H01R 12/712 439/607.35 |
| 5,288,248 | A * | 2/1994 | Chen | H01R 13/658 439/108 |
| 5,672,064 | A | 9/1997 | Provencher et al. | |
| 6,109,966 | A * | 8/2000 | Chiou | H01R 12/722 439/607.03 |
| 6,764,338 | B2 * | 7/2004 | Fang | H01R 12/721 439/607.2 |
| 7,811,127 | B2 * | 10/2010 | Tsuzaki | H01R 13/6582 439/607.01 |
| 8,192,221 | B2 | 6/2012 | Schmettkamp et al. | |
| 8,430,675 | B2 * | 4/2013 | Hardy | H01R 12/724 439/63 |
| 9,004,944 | B2 * | 4/2015 | Annequin | H01R 13/6594 439/607.13 |
| 9,362,679 | B2 * | 6/2016 | Schreier | H01R 13/502 |
| 9,502,796 | B2 * | 11/2016 | Genau | H01R 12/724 |
| 9,509,071 | B2 | 11/2016 | Filipon et al. | |

FOREIGN PATENT DOCUMENTS

| | | | | | |
|---|---|---|---|---|---|
| CN | 108666786 | A * | 10/2018 | |
| DE | 3723347 | A1 | 1/1989 | |
| DE | 196 18 497 | A1 | 11/1997 | |
| DE | 102009058616 | B4 | 11/2011 | |
| DE | 102010051954 | B3 | 2/2012 | |
| DE | 102012105256 | A1 | 12/2013 | |
| DE | 102012105257 | A1 * | 12/2013 | H01R 12/71 |
| DE | 202013100330 | U1 | 4/2014 | |
| DE | 10 2012 016 305 | A1 | 5/2014 | |
| DE | 102013002709 | A1 | 8/2014 | |
| DE | 20 2018 105 085 | U1 | 9/2018 | |
| DE | 202018105085 | U1 * | 10/2018 | H01R 12/707 |
| DE | 202015009708 | U1 | 5/2019 | |
| EP | 2525442 | A2 * | 11/2012 | H01R 13/6474 |
| EP | 2417675 | B1 * | 5/2014 | H01R 13/6658 |
| EP | 2955791 | B1 * | 5/2018 | H01R 12/724 |
| JP | H03-101877 | U | 10/1991 | |
| VN | 2264994 | Y * | 10/1997 | H01R 13/648 |
| WO | WO-9702629 | A1 * | 1/1997 | H01R 12/716 |
| WO | WO-2010115591 | A1 * | 10/2010 | H01R 13/6658 |

OTHER PUBLICATIONS

Search Result issued in German Patent Application No. 102018132440.5; Application Filing Date Dec. 17, 2018; dated Apr. 28, 2022 (1 page).

* cited by examiner

MULTI-PART PRINTED CIRCUIT BOARD ADAPTER PLUG

RELATED APPLICATIONS

This application is a national stage application of International Application No. PCT/EP2019/085380, filed Dec. 16, 2019, which is related to and claims priority to German Patent Application No. 10 2018 132 440.5, filed Dec. 17, 2018, the entire disclosures of which are hereby incorporated by reference.

BACKGROUND

The invention relates to an adapter plug and plug-in connector for making electrically conductive contact between a printed circuit board and at least one further electrical component, having at least one contacting device for conducting current within the adapter plug. Furthermore, the invention relates to an assembly method for making electrically conductive contact between a printed circuit board and at least one further electrical component.

For contact-making or for producing electrically conductive connections between printed circuit boards or with other electrical, electronic and current-conducting components or elements, a multitude of different solutions are used. Depending on the contacting task, required additional functions and various requirement and application environments, there are used differently configured printed circuit board plug-in connectors, strand wirings, releasable socket contact plugs of different geometrical configurations or cable-based current-conducting designs.

A multi-part printed circuit board plug-in connector situation is shown in DE 10 2009 058 616 B4. This plug-in connector, which is designed to contact printed circuit boards arranged in parallel, consists of a first and a second plug-in connector part having mutually aligned contact elements oriented perpendicularly to the printed circuit boards. The locking device integrated into the plug-in connector is likewise of two-part construction and combines force-fitting and form-fitting functional components with corresponding rear-engagement portions.

DE 20 2013 100 330 U1 discloses a printed circuit board plug-in connector of modular design that has a base module and a plug-on module. Both modules are designed for fastening to the printed circuit board on the one hand and relative to one another on the other hand and, for this purpose, have coupling means, with the result that a flexibly adaptable plug-in connector arrangement is supported. In a comparable manner to a construction kit it is possible, depending on the contacting requirement, for the required plug-in connector arrangement to be built up.

If there are requirements placed on the printed circuit board plug-in connectors in terms of sealing in relation to water and other liquids, multi-part printed circuit board plug-in connectors having sealing elements may be necessary. DE 10 2013 002 709 A1 shows a plug-in connector for printed circuit boards, having a housing with sealing surface formation and a corresponding sealing element. The printed circuit board plug is supplemented by press-in elements and signal contacts.

Printed circuit boards as constituent parts of electronic components are frequently also installed in structural parts and products that are present as mass-produced articles in considerable numbers. Printed circuit boards that are to be contacted electrically can be found, for example, in open-loop controls, closed-loop controls or electronics of electric motors, household devices, vehicles, telephones, telecommunication devices, data-processing systems, entertainment electronics and so forth. In order to protect these electronic components from external influences and effects, they can frequently be mounted within housings, casings or behind coverings and lids. These boundary conditions result in a number of requirements in terms of production, assembly and cost-effective design.

In addition to the requirement of individual parts reduced as far as possible within the sense of the integrated mode of construction, mass-produced articles must nowadays ideally not only be produced but also installed or assembled in an automated manner. It is important here that the assembly components of automatic devices, gripping devices or robot devices are configured to be grippable, able to be oriented and positionable. In addition, there must be realized collision-free movement spaces for the gripping devices with the gripped part, component. In the case of printed circuit board plug-in connections, this is routinely a particular condition that makes automatic assembly more difficult. The causes for this are plug-in directions, plug-in location and plug-in path for realizing the electrically conductive connection. The movement space is often limited by the arrangement of the printed circuit board in a housing.

DE 37 23 347 A1 discloses a plug-in connection for printed circuit boards that assists secure assembly fastening by means of studs having cylindrical regions. The studs of the fastening part comprise a first cylindrical region on the circumference of which there are integrally formed distributed spring tongues which face in the axial direction and which, with the formation of latching shoulders, are bent by way of offsets facing in the radial direction, wherein, after the studs have been inserted into a printed circuit board bore, the cylindrical region is received by the bore, and the latching shoulders of the tongues latch behind the printed circuit board. In order to make the plug-in connector assembly easier, there is provision that the studs/tongues have overall a larger length than the soldering pins. Here, setting the plug-in connector onto the printed circuit board first of all causes the plug-in connector to be pre-centered, with the result that the remaining soldering pins can be more easily inserted into the corresponding printed circuit board bores. However, with regard to the required handling space or installation space, this is disadvantageous since the space requirement during assembly is increased.

If there is present the constellation of the lateral wall assembly of a device plug, plug-in connector, there may occur further disadvantageous problems. By "lateral wall assembly" there is to be understood the connection of the plug-in connection to the lateral edge of the printed circuit board, that is to say that the plug-in direction occurs in the printed circuit board plane. Frequently, the plug-in connector, in the plugged state, is horizontal in the printed circuit board plane and can protrude beyond the printed circuit board lateral edge. If the printed circuit board having such a plug-in constellation is installed in a housing which surrounds the printed circuit board lateral edges, the plug-in connector as a rule has to be preassembled, since the required plug-in space is no longer available after the printed circuit board has been fitted into the housing. Preassembled plug-in connectors can hinder the assembly process of the printed circuit board as a result of the adjacent lines and of the lateral contour, increased by the plug-connector projection, of the preassembled printed circuit board-plug-connector combination. What is a desirable, but unsolved, requirement here is to circumvent the preassembly of the plug-in connector and to provide an alternative solution.

SUMMARY

It is an object of the invention for the contact-making or production of electrically conductive connections of printed circuit boards between one another or with other electrical, electronic and current-guiding components or elements, or device plug-in connectors in contact with housing walls of devices to be improved in such a way that the aforementioned disadvantages of the prior art are at least partially reduced and/or to support an improved assembly, which can in particular be carried out in an automated manner, of the contacting means even under limited handling space conditions.

The object is achieved according to the invention in that use is made of an at least two-part printed circuit board plug-in connector which, in a preferred application, realizes the contact-making of a standard M16 device part with various pole numbers via an adapter plug on a printed circuit board.

The invention proposes that an adapter plug be used that contacts any standard M16 device part, or device parts, with such a screw connection, for example a housing screw connection, with a printed circuit board. Any pole numbers, in particular 8 and 14 poles, are supported.

In terms of construction, there is provision that the adapter plug has special contacts on the connection side of the M16 screw connection that are configured on the front side, such as a socket, and on the rear side, such as a pin. The contacts are formed, on the printed circuit board side, as soldered contacts or press-in contacts and, on the device plug side, as resilient contact sockets, which are electrically conductively connected or realized via a right-angled connection and preferably in one piece.

The adapter plug has, on the inner side on the plug-in side, socket contacts which are provided, at the opposite end and thus on the receiving side or connection side, with contact pins, pin contacts. Furthermore, the adapter plug is constructed on the connection side to the printed circuit board in such a way that special contacts reverse the connection direction of the printed circuit board contact pattern and, in terms of minimum installation space and maximized tolerance, are configured in a plane perpendicular to the printed circuit board plane and—in the situation in which the printed circuit board is mounted in the housing—perpendicular to the housing wall in the plug-in direction.

In a corresponding manner, the contact and/or the contact regions of the printed circuit board plug-in connection are designed as socket contacts and configured for plugging in the pin contact ends of the device plug-in connector.

The invention recognizes that a contact insert can be formed on the printed circuit board side of the adapter plug by a multi-part configuration that allows simple assembly even without machine support. A contact insert of the adapter plug is configured in such a way that the contacts are exactly oriented in the plug-in direction. In addition to automated assembly by means of different handling devices, the invention also assists manual assembly and, for this purpose, can optionally geometrically prevent faulty plugging-together as a result of asymmetrical contact arrangements and/or additional features.

On account of the contacting via the adapter plug according to the invention, it is possible to provide particularly favorable starting situations for automated assembly of the contact-producing components between printed circuit boards and their contact partners. A possible automated assembly process sequence can occur after a printed circuit board assembly in a direction or plane in that the adapter plug has been assembled already before the printed circuit board has been installed. The adapter plug can be designed in such a way that the plug-in directions of the adapter plug with respect to the printed circuit board lie in mutually differing spatial directions. For example, consideration is given, in the assembly direction of the device plug, to a right-angled position such that the printed circuit board adapters are assembled in the vertical direction, and the M16 plug-in connector is assembled in the horizontal direction. Previous solutions provide for the contacting to the printed circuit board to be produced via direct contacting with the contact partner. The solution is independent of the thickness of the board, or printed circuit board, and can thus be used universally. It is also possible in this way for required assembly space to be considerably reduced.

The simplified assembly process achieved by means of the invention not only supports manual but also automated assembly and is suitable for reducing the assembly space required for assembly. This can be used in order to produce the electrical contacting even in confined spatial conditions—for example printed circuit boards arranged within electronics housings or smartphones.

Strand wiring is no longer required in the use of the proposed adapter plug between the device plug and the printed circuit board plug or the printed circuit board. It is not only this circumstance that acts in a cost-reducing manner, but also the fact that the electrical contacting is independent of the printed circuit board thickness, with the result that only an adapter plug need be kept available for the contacting task. If conventional printed circuit board plugs are used in the direct contacting path and/or plug-in connectors are provided for the use on the printed circuit board lateral edge, these contacting means are dependent on the board thickness or have to be adapted thereto. By contrast, the contacting design according to the invention is independent thereof and can therefore be used for all of the geometric designs and thickness variants of the printed circuit boards to be contacted.

BRIEF DESCRIPTION OF THE DRAWINGS

The invention will be explained in more detail below on the basis of two exemplary embodiments in conjunction with the figures, in which.

DETAILED DESCRIPTION

Figure 1A:
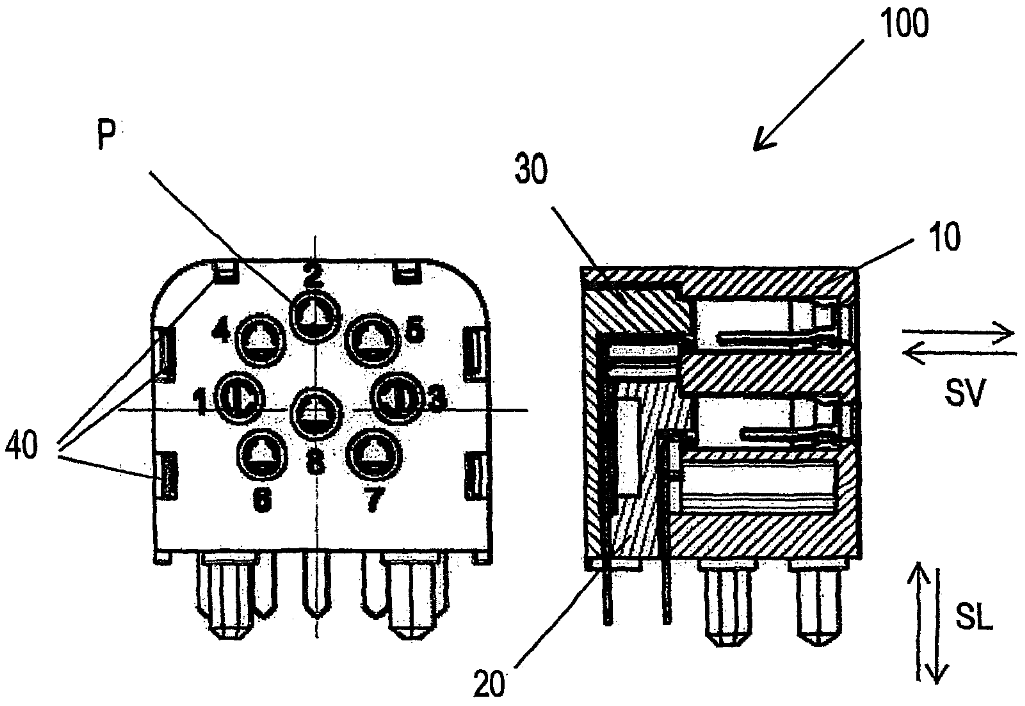
FIG. 1*a* shows, on the left-hand side, the front view and, on the right-hand side, the lateral sectional illustration of the adapter plug formed in exemplary fashion as an 8-pole printed circuit board plug-in connector having two plug-in planes or plug-in directions which are not parallel to one another.

FIG. 1*a* shows, on the left-hand side, the front view and, on the right-hand side, the lateral sectional illustration of the adapter plug 100 in the exemplary form of an 8-pole printed circuit board plug-in connector having two plug-in planes or plug-in directions SV, SL which are not parallel to one another. In the exemplary embodiment shown, the plug-in planes SL, SV are arranged at right angles to one another. Also possible, independently of the pole number, are any other positions, for example skew arrangements or those that differ from the right-angled orientation. The exemplary embodiment shown in FIG. 1*a* has an 8-pole contact pattern in an axisymmetric formation with respect to the vertical and an asymmetrical configuration with respect to the horizontal. In this way, both the position and the orientation of the plug-in position of the adapter plug 100 and plug-in connector 110 with respect to one another are geometrically defined. Pole numbers and arrangements differing therefrom are also supported by the invention.

The adapter plug-in housing is of at least two-part construction and is formed by a base housing 10 and at least one conductor guide 20. Optionally, the adapter plug-in housing can be supplemented or completed by a rear wall 30, which functionally interacts with the base housing 10 and/or the conductor guide 20 with regard to arresting the inner contacting elements and secures the rear-side enclosure. Depending on the plug-in situation and environmental conditions, it is also possible to dispense with the rear wall 30. Consideration is preferably given to fixing the at least two housing elements relative to one another by means of arresting devices 40 such that there is formed a structural unit which supports simplified and reliable manual or automatic handling and assembly. The arresting devices can be formed by way of example by snap lugs, rear-engagement portions or latching hooks, with the result that a force-fitting and/or form-fitting arresting situation is achieved.

Figure 1B:
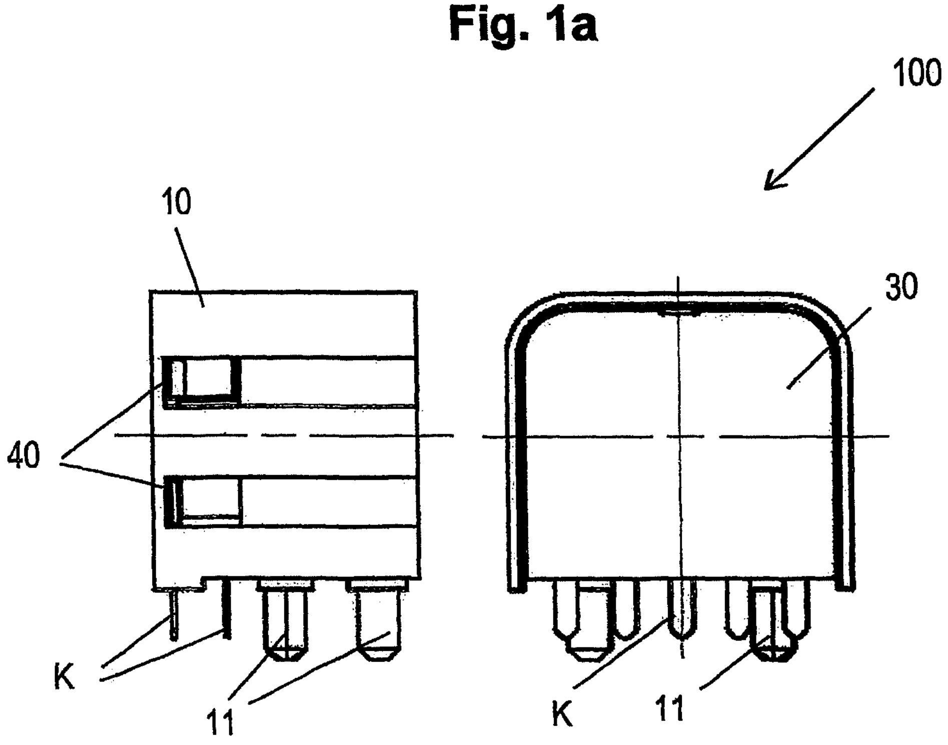
FIG. 1*b* shows, on the right-hand side, the rear view and, on the left-hand side, the side view of the adapter plug.

FIG. 1*b* encompasses, on the right-hand side, the rear view and, on the left-hand side, the side view of the adapter plug 100. The contacts K electrically conductively connected to the poles P within the adapter plug 100 are configured in such a way that they reverse the connection direction and are designed both for minimum required installation space and for high tolerance in the plug-in direction SL.

On the printed circuit board side, the adapter plug 100 can furthermore be equipped with at least one plug-in pin 11. The at least one plug-in pin 11, which is preferably formed in one piece with the adapter plug base housing 10, can be arranged symmetrically or asymmetrically with regard to the plug-in hole pattern and have a prismatic or cylindrical cross section. If a plurality of plug-in pins 11 are provided, the plug-in safety and reliability of the plug-in connection between adapter plug 100 and printed circuit board can be increased. An advantage when using a plurality of plug-in pins 11 is the formation in different cross sections, for example round and triangular and polygonal cross sections. In this way, the plug-in-correct orientation of the adapter plug 100 relative to the printed circuit board is geometrically forced.

The adapter plug 100 is formed, on its printed circuit board side, by a three-part contact insert and configured in such a way that simple assembly without machine assistance is made possible. The adapter plug 100 is formed, on its plug-in connector side, by a two-part contact insert and configured in such a way that the exact orientation of the contact of the plug-in connector 110 for engagement in the poles P is ensured. It is also optionally possible, on the plug-in connector side of the adapter plug 100, for there to be integrated an additional feature so as to avoid incorrect plugging in the sense of the orientation of the plug-in partners relative to one another.

Figure 2A:
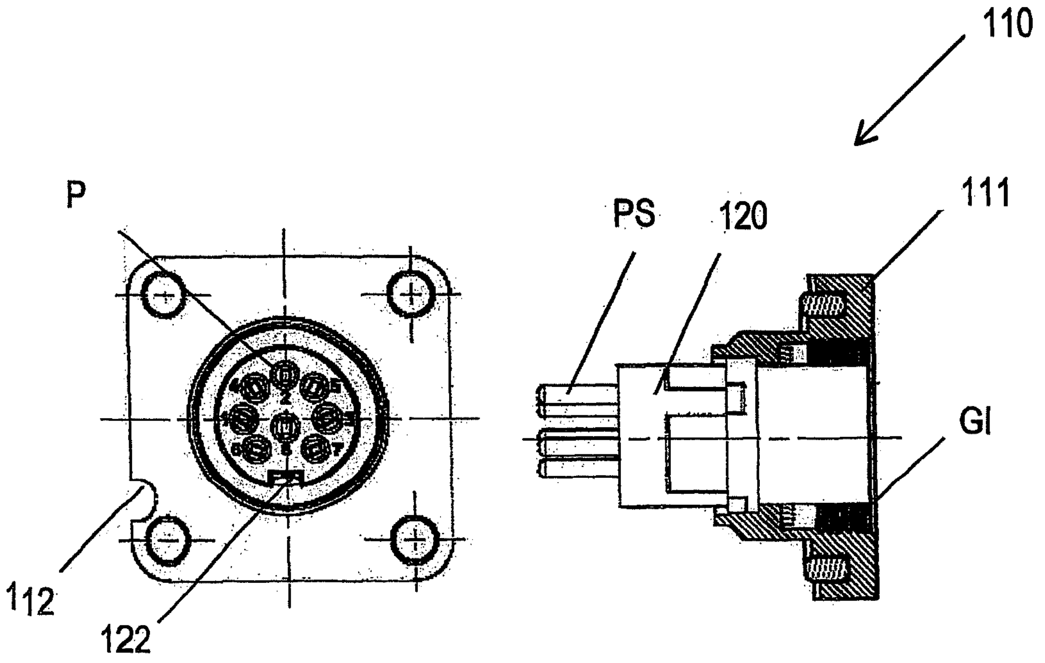
FIG. 2*a* shows, on the left-hand side, the front view and, on the right-hand side, the lateral sectional illustration of the plug-in connector, in the exemplary form of a round plug, corresponding to the adapter plug illustrated in FIG. 1.

FIG. 2*a* illustrates, on the left-hand side, the front view in the direction of the device plug to be contacted and, on the right-hand side, the lateral sectional illustration of the plug-in connector 110, here in the exemplary form of a round plug, which corresponds to the adapter plug 100 illustrated in FIG. 1. In a plug-in connector housing 111 there is received a contact insert 120 which, in a manner corresponding to the adapter plug 100 according to FIGS. 1*a*, 1*b*, has poles P and associated pole pins PS. The poles P are designed as special contacts on the plug-in side as sockets and, on the rear side, in pin form.

The plug-in connector housing 100 can optionally have an orienting aid 112, here in exemplary form as a half-round cutout in the flange region of the plug-in connector housing 111. The contact insert 120 with the poles P and the pole pins PS can optionally likewise have an orienting aid 122 that prevents incorrect plugging and/or assists a defined position of the contact insert 120 within the plug-in connector housing 111.

Figure 2B:
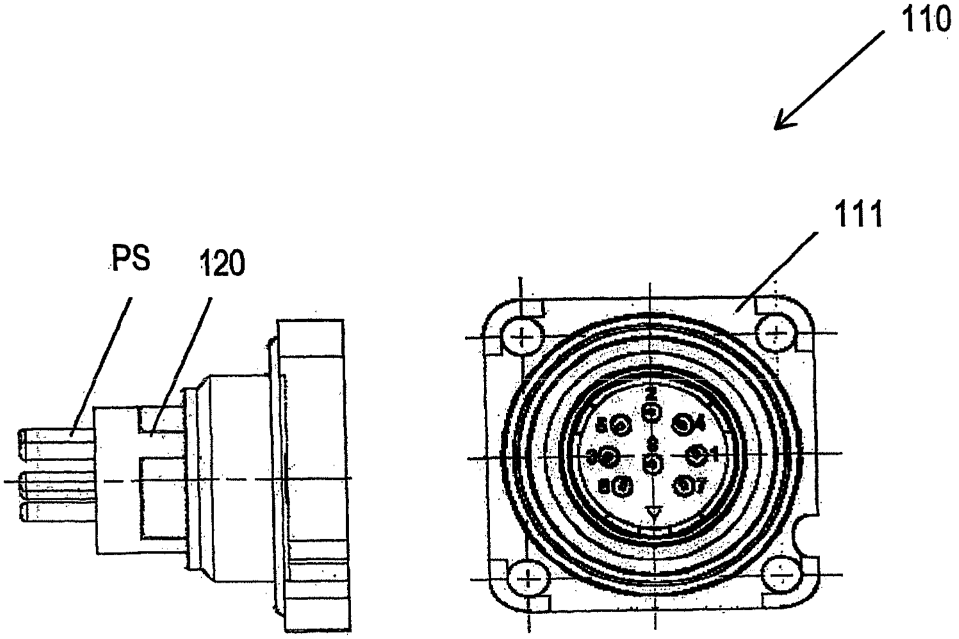
FIG. 2*b* shows, on the left-hand side, the side view and, on the right-hand side, the rear view of the plug connector.

FIG. 2*b* shows, on the left-hand side, the side view and, on the right-hand side, the rear view of the plug-in connector 110. If the plug-in connector 110, as illustrated, takes the form of a round plug-in connector, it can be equipped, for securing purposes, that is to say by way of a form-fitting connection with the contacting partner, with a thread GI (here: metric internal thread), which can be screwed with the corresponding (external) thread GA of the device plug or contacting partner.

Figure 3A:
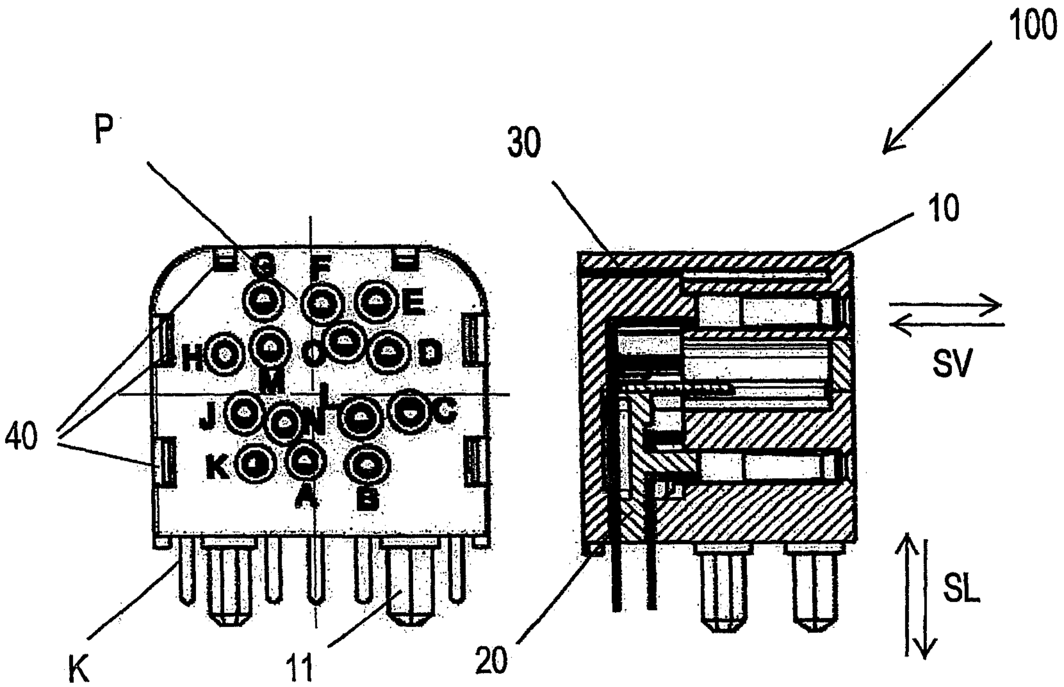
FIG. 3*a* shows, on the left-hand side, the front view and, on the right-hand side, the lateral sectional illustration of the adapter plug in the form for example of a 14-pole printed circuit board plug-in connector having two plug-in planes or plug-in directions which are not parallel to one another.

FIG. 3*a* encompasses, on the left-hand side, the front view and, on the right-hand side, the lateral sectional illustration of the adapter plug 100, by way of example in the form of a 14-pole printed circuit board plug-in connector having two plug-in planes or plug-in directions which are not parallel to one another. This exemplary embodiment shows that the invention also corresponds in conjunction with 14-pole contacting tasks. Finally, the invention can be realized independently of pole number and is likewise not limited to symmetrical pole plug-in patterns.

Depending on the pole plug-in pattern and/or the pole number, it may be required for the adapter plug housing in turn to be of at least two-part design and then to be supplemented by at least one further housing component. As in the case of the adapter plug 100 of 8-pole design, the 14-pole variant is also configured at least in 2 plug-in rows—here specially 4 rows—in the plug-in direction with respect to the printed circuit board SL in terms of the contacts K and the plug-in pins 11. By virtue of the arrangement of the tongue contact elements K and/or of the plug-in pins 11 in at least two plug-in planes, it is possible for the support surface of the adapter plug 100 with respect to the printed circuit board to be increased, with the result that tilting of the plug-in partners relative to one another during the plugging-in operation is reduced and secure support in the plugged state is improved.

Figure 3B:
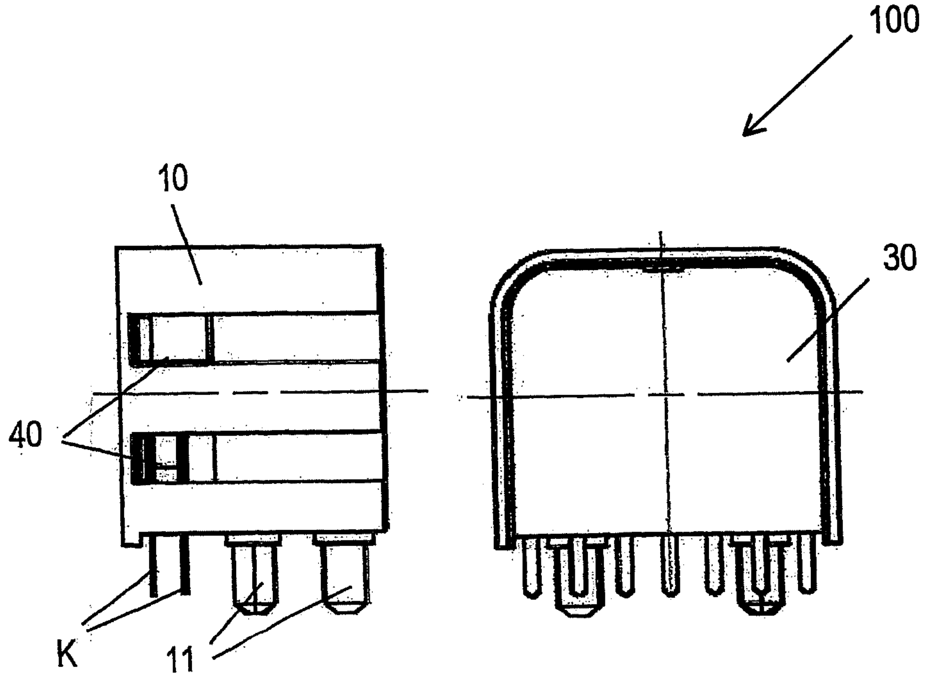
FIG. 3*b* shows, on the right-hand side, the rear view and, on the left-hand side, the side view of the adapter plug.

FIG. 3*b* encompasses, on the right-hand side, the rear view and, on the left-hand side, the side view of the adapter plug 100 in its 14-pole variant shown by way of example. The contacts K, electrically conductively connected to the poles P within the adapter plug 100, are, as in the 8-pole exemplary embodiment from FIG. 1*b*, configured in such a way that they reverse the connection direction and are designed both for minimally required installation space and also for high tolerance in the plug-in direction SL.

Figure 4A:
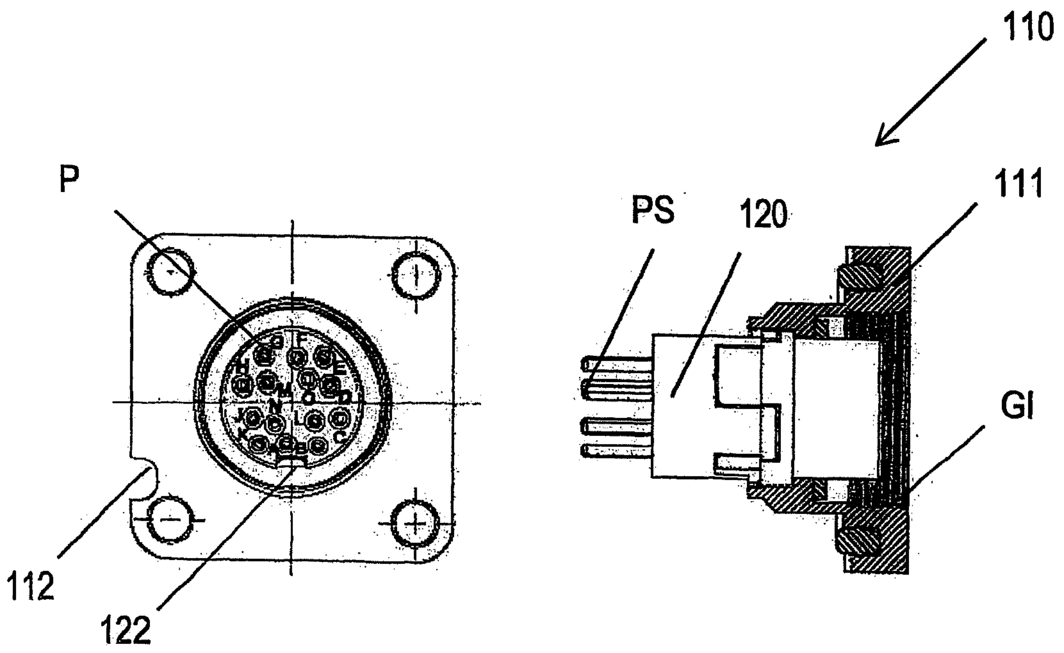
FIG. 4*a* shows, on the left-hand side, the front view and, on the right-hand side, the lateral sectional illustration of the plug-in connector, in the exemplary form of a round plug, which corresponds to the adapter plug illustrated in FIG. 3.
Figure 4B:
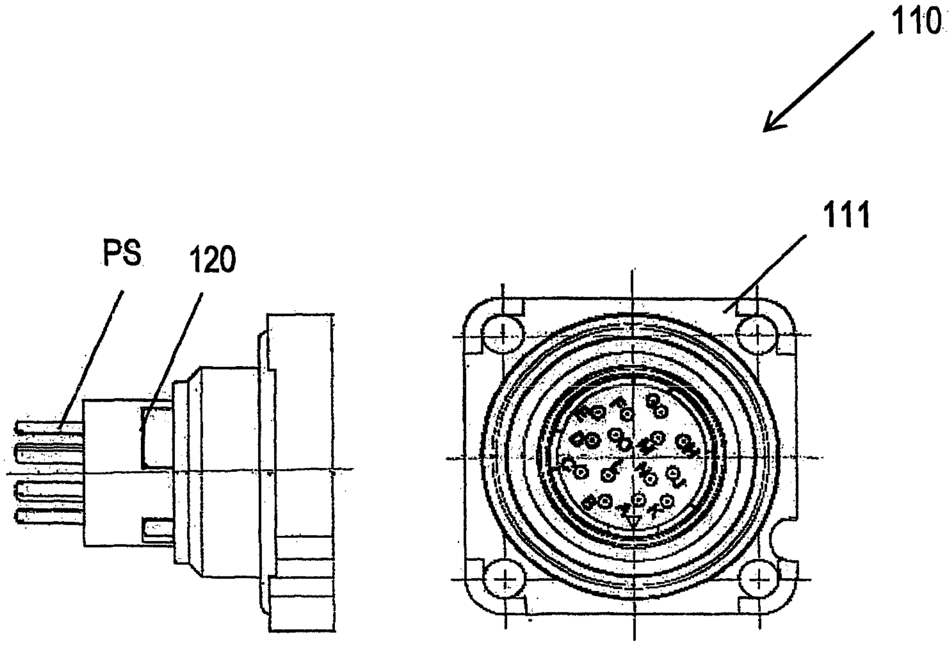
FIG. 4*b* shows, on the left-hand side, the side view and, on the right-hand side, the rear view of the plug-in connector.

In an analogous manner to FIGS. 2*a* and 2*b* with the plug-in connector 110 of 8-pole round design, FIGS. 4*a* and 4*b* show an exemplary variant of 14-pole configuration which, in a corresponding manner to the adapter plug 100 according to FIGS. 3*a*, 3*b*, has poles P and associated pole pins PS.

LIST OF REFERENCE SIGNS

10 Base housing
11 Plug-in pin
20 Conductor guide
30 Rear wall, rear-side adapter plug housing element
40 Arresting device
100 Adapter plug, printed circuit board plug-in connector
110 Plug-in connector, round plug
111 Plug-in connector housing
112 Orienting aid, plug-in connector housing
120 Contact insert
122 Orienting aid, contact insert
GA Thread, external
GI Thread, internal
K Contact, tongue contact element
P Pole, plug-in connector contact
PS Pole pins, plug-in connector pins
SL Plug-in plane, plug-in direction with respect to the printed circuit board
SV Plug-in plane, plug-in direction with respect to the plug-in connector

The invention claimed is:

1. An adapter plug for making electrically conductive contact between a printed circuit board and at least one further electrical component, the adapter plug having at least one contacting device for conducting current within the adapter plug, wherein the adapter plug is in at least two-part form and geometrically constructed in such a way that two plug-in planes, which are not parallel to one another, are formed by the plug-in directions of the at least one further electrical component and the printed circuit board, respectively, wherein the adapter plug has a unitary housing including a printed circuit board side configured face the printed circuit board and a plug-in connector side configured to face the at least one further electrical component, and wherein the adapter plug has, in the plug-in direction of the printed circuit board, at least one plug-in pin integrally formed with the plug-in side of the housing, and wherein the adapter plug has at least one contact insert which includes at least one contact and at least one pole connected to the at least one pole, the at least one contact extending through the printed circuit board side of the housing.

2. The adapter plug as claimed in claim 1, wherein the plug-in directions are arranged at an angle of less than or equal to 90° to one another.

3. The adapter plug as claimed in claim 1, wherein the housing includes at least two housing parts configured to be fixed relative to one another by arresting devices, with the result that a structural unit is formed that assists simplified and reliable manual or automatic handling and assembly.

4. The adapter plug as claimed in claim 1, wherein the adapter plug has, in the printed circuit board plug-in direction, a plurality of contacts, the plurality of contacts including tongue contact elements, the number of which corresponds to the pole number to be contacted and which are arranged in at least one plug-in row.

5. The adapter plug as claimed in claim 1, wherein the at least one contact includes a plurality of tongue contact elements of the contact insert, are designed in such a way that the connection direction of the printed circuit board contact pattern is inverted and configured in terms of minimum installation space and maximum tolerance in the plug-in direction.

6. The adapter plug as claimed in claim 1, wherein the contact insert is formed, on the printed circuit board side of the adapter plug, by a multi-part configuration.

7. The adapter plug as claimed in claim 1, wherein the contact insert is configured, on the plug-in connector side of the adapter plug, in such a way that the poles are oriented exactly in the plug-in direction.

8. The adapter plug as claimed in claim 1, wherein the contacts of the contact insert are angled and, on a plug-in connector side of the adapter plug, there are provided socket contacts for connection with the plug-in connector pins of the further electrical component.

9. The adapter plug as claimed in claim 1, wherein the further electrical component is a printed circuit board or a device plug.

10. A plug-in connector as claimed in claim 1, having a plug-in connector housing and a contact insert, wherein the contact insert is formed, on a device side, by at least one pole and, on an adapter plug side, by at least one pole pin.

11. The plug-in connector as claimed in claim 10, wherein at least one orienting aid is provided.

12. An assembly method for making electrically conductive contact between a printed circuit board and at least one further electrical component, comprising the following assembly steps: a. making contact between the printed circuit board and the adapter plug as claimed in claim 1, in a printed circuit board plug-in plane in such a way that a prefabricated structural element unit is formed, b. installing the prefabricated structural element unit in a housing for receiving at least one printed circuit board, c. making contact between the prefabricated structural element unit and a device plug in a plug-in connector plug-in plane of the adapter plug, wherein, in assembly step a. or prior to assembly step c., a plug-in connector is contacted in the plug-in connector plug-in plane of the adapter plug.

* * * * *